Patented Aug. 19, 1930

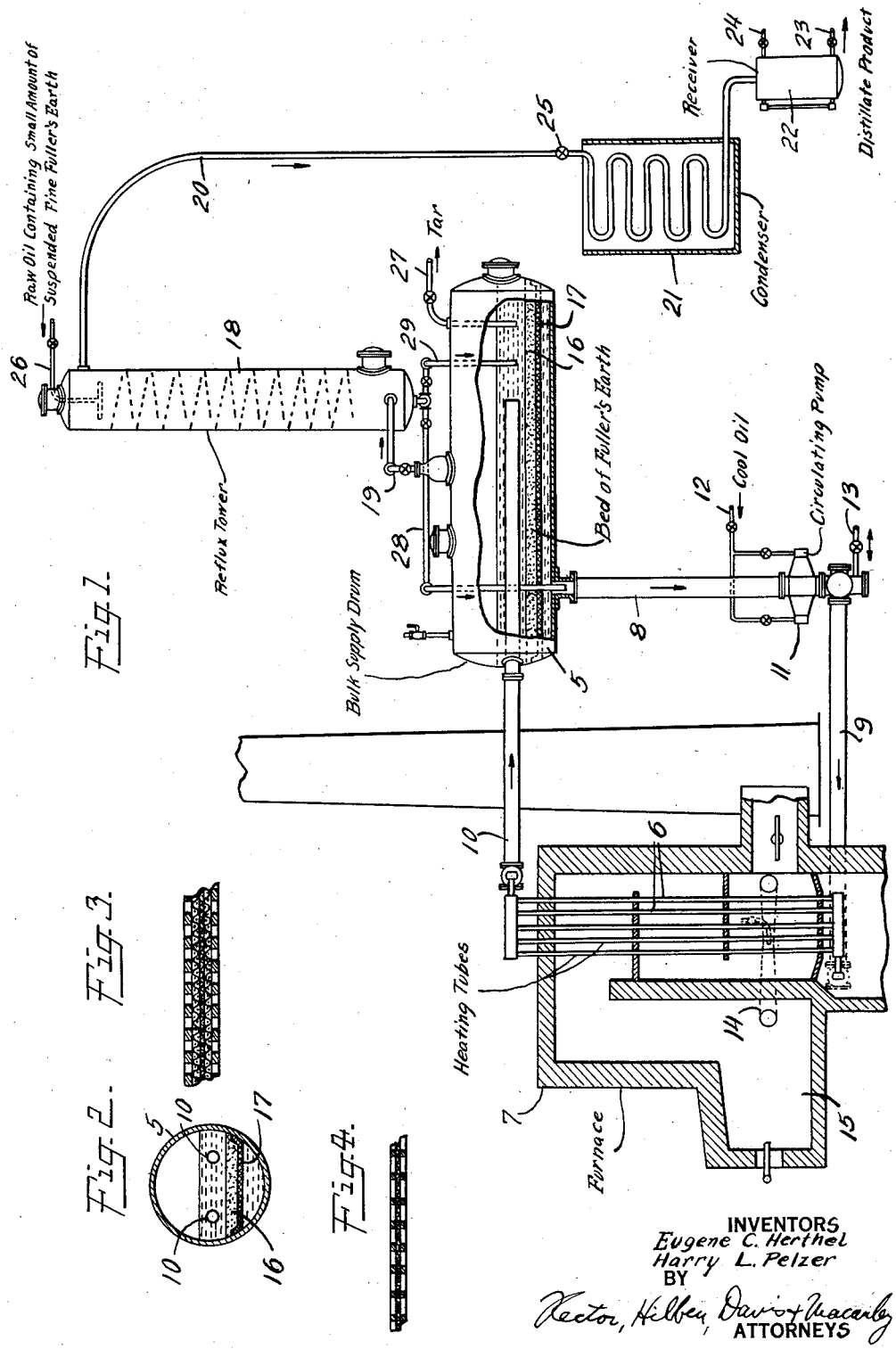

1,773,180

UNITED STATES PATENT OFFICE

EUGENE C. HERTHEL, OF CHICAGO, ILLINOIS, AND HARRY L. PELZER, OF HIGHLAND, INDIANA, ASSIGNORS TO SINCLAIR REFINING COMPANY, OF NEW YORK, N. Y., A CORPORATION OF MAINE

ART OF CRACKING HYDROCARBON OILS

Application filed June 11, 1927. Serial No. 198,251.

This invention relates to improvements in the cracking of heavier and higher boiling hydrocarbon oils, such as gas oil, for the production of lighter and lower boiling hydrocarbon oils, such as gasoline and gasoline-containing distillates, therefrom. More particularly, the invention relates to improvements in operations of the type described in application Serial No. 704,926, filed April 8, 1924, which has matured into Patent No. 1,634,666.

In the operation there described, a charge of oil in a pressure still is repeatedly circulated from a bulk supply drum through heating tubes and back to the bulk supply drum and a bed of fuller's earth, or other absorbent or desulphurizing or filtering material, is maintained in the path of the circulating oil. In one capacity, this bed of fuller's earth acts to remove from the circulating still charge asphaltic and pitch-like constituents, particularly more objectionable constituents of this character.

In carrying out this operation, we have observed a tendency, in many instances, toward the formation of an asphaltic or pitchy crust on top of the earth bed. The formation of such a crust in turn tends to interfere with full effectiveness of the entire depth of the earth bed. The formation of such a crust in local spots or patches also tends to render the earth bed ineffective over local areas.

This invention provides an improved operation in which any tendency toward formation of such a crust is inhibited, and in which any tendency of any such crust that may form to interfere with full effectiveness of the entire bed of earth is reduced. The invention also provides for the addition of fresh earth to the bed of earth maintained in the still charge during operation.

In carrying out the present invention, fine fuller's earth is supplied to the charge of oil circulating in the pressure still through the bed of earth therein in suspension in raw oil supplied to the cracking operation. The raw oil containing suspended fine fuller's earth may be supplied to the oil circulating from the bulk supply drum to the heating tubes after passage through the earth bed so that the suspended earth is caused to pass through the heating tubes or it may be supplied to the circulating still charge just before it passes through the earth bed. In either case, the fine fuller's earth supplied in suspension in raw oil is separated on the earth bed in the pressure still as the still charge circulates therethrough. Fresh earth may thus be added to the earth bed in the pressure still continuously during the cracking operation. Where the fine fuller's earth supplied in suspension in raw oil, or part of it, is caused to pass through the heating tubes of the pressure still, the earth bed acts to prevent any undue accumulation of suspended fine earth in the circulating still charge. In this aspect, the invention provides for circulation of suspended fine earth through the heating tubes under advantageous conditions. The vapors from the pressure still may, with advantage, be subjected to a refluxing operation into which raw oil containing suspended fine earth is directly introduced and from which the admixed refluxed condensate, unvaporized raw oil and suspended fine earth are supplied to the circulating still charge.

The invention will be further described in connection with the accompanying drawings, which illustrate, in a conventional and diagrammatic manner, one form of apparatus adapted for the practice of the process of the invention; but it is intended and will be understood that the invention is not limited to operations carried out in a specific form of apparatus used for purposes of illustration. In the accompanying drawings, Fig. 1 represents, in elevation and partly in section and with parts broken away, a pressure still system adapted for the practice of the process of the invention, Fig. 2 is a sectional view through the bulk supply drum of the pressure still illustrated in Fig. 1, and Figs. 3 and 4 are fragmentary enlarged sections of suitable supporting means for the bed of earth maintained in the bulk supply drum.

The pressure still illustrated comprises a bulk supply drum 5 and a battery of heating tubes 6 arranged in the heating flue of a furnace 7 and circulating connections 8, 9 and 10 including a circulating pump 11 for circulating oil from the bulk supply drum upwardly through the heating tubes and back to the bulk supply drum. Cool oil for cooling and lubricating the bearings of the circulating pump is supplied through connection 12. Raw oil in excess of that required for cooling and lubricating the pump bearings may be supplied through this connection and forced into the oil circulating in the still through the pump bearings. Connection 13 is provided for pumping out the still at the end of a run and for initially charging the still at the beginning of a run. For tempering the heating gases passing through the heating flue in which the heating tubes 6 are arranged, a portion of the heating gases escaping from the heating flue may be recirculated through return flue 14, provided with suitable forcing means, for admixture with fresh hot products of combustion from the fire box 15.

Arranged in the bulk supply drum 5, below the normal liquid level therein so as to be submerged in the still charge, is a bed 16 of fuller's earth on a suitable supporting means 17 adapted to retain the fuller's earth but to permit free passage of oil. This bed of fuller's earth extends entirely across the bulk supply drum 5 between the circulating connections 8 to the heating tubes and the circulating connections 10 from the heating tubes. This bed of earth is directly exposed to the circulating still charge, and due to its large area passage of the circulating oil through the earth bed is relatively slow as compared to its rate of passage through the heating tubes.

Arranged above the bulk supply drum 5 is a reflux tower 18 connected to the bulk supply drum by a vapor line 19. Vapors remaining uncondensed escape from the upper end of the reflux tower 18 through vapor line 20 to the condenser 21 arranged to discharge into the receiver 22. The distillate product is discharged from this receiver through connection 23 and uncondensed vapors and gases through connection 24. Pressure in the system may be maintained and regulated by means of valve 25, or by suitable valves arranged beyond the condenser or receiver. Connection 26 is provided for introducing raw oil into the upper end of the reflux tower 18. Connection 27 is provided for discharging pitch-laden oil or tar from the circulating still charge during operation.

The reflux condensate or oil mixture collecting in the lower end of the reflux tower 18 flows through connection 28 into the oil circulating from the bulk supply drum 5 to the heating tubes 6 after passage through the earth bed 16 or through connection 29 into the body of oil in the bulk supply drum 5 above the earth bed 16. The reflux condensate or oil mixture from the reflux tower 18 may be directed either through connection 28 or through connection 29 or partly through both of these connections by appropriate valves as illustrated.

The support means 17 for the bed of fuller's earth in the bulk supply drum 5 may consist of one or more screens of appropriate mesh to retain the fuller's earth used arranged between perforated plates or gratings, as illustrated in Figs. 3 and 4.

In operation, a bed of fuller's earth is arranged in the still and the still then charged with oil and brought to cracking conditions of temperature and pressure in the usual way. In a still of the type illustrated in which the initial charge of oil amounts to about 8,000 gallons, the initial bed of fuller's earth may consist of three or four tons of 15–30 mesh fuller's earth. For the production of gasoline from gas oil character charging stock, for example, the still may be operated under a pressure in the neighborhood of 125 pounds per square inch and the charge maintained at a corresponding cracking temperature. After the still is brought to cracking conditions of temperature and pressure, vapors are taken off through the reflux tower to the condenser and condensed therein to form the distillate product and the introduction of raw oil is begun. Before the concentration of asphaltic and pitch-like constituents in the still charge reaches an objectionable value, the discharge of pitch-laden oil from the still is begun. At this point in the operation, the distillate product may be taken off at a rate of about 1,000 gallons per hour, pitch-laden oil discharged at a rate of about 1,500 gallons per hour and raw oil supplied at a rate of about 2,500 gallons per hour. The refluxing operation is controlled to condense and reflux to the still components of the vapors heavier than desired as components of the distillate products by regulated introduction of raw oil into the vapors in the refluxing operation. Any raw oil supplied to the operation in excess of that introduced into the refluxing operation, in the pressure still illustrated, is forced in through the bearings of the circulating pump. Such additional raw oil or part of it, however, may be supplied directly to the circulating still charge.

Fine fuller's earth is supplied to the operation in suspension in the raw oil introduced into the refluxing operation. Raw oil supplied directly to the circulating still charge may also carry fine fuller's earth in suspension. The fine fuller's earth so supplied to the operation in suspension in raw oil may, for example, be of 60–100 mesh. It is advantageous to use relatively fine earth particularly where the suspended earth is caused to circulate through the heating tubes of the still, but coarser earth may be used. The raw oil suspension may contain as much as onefourth to one-half pounds of fuller's earth per barrel of oil or somewhat more. In the operation of a pressure still of the type illustrated, several tons of fresh earth may thus be supplied during the cracking operation. The fine earth so supplied to the operation separates from the circulating charge of oil on the top surface of the earth bed in the pressure still. The top surface of the earth bed is thus more or less continuously replaced with fresh earth during the operation. A part of the fine fuller's earth may be discharged from the operation in suspension in discharged pitch-laden oil.

Fuller's earth is a particularly advantageous material to use in carrying out the present invention. Other similar absorbent earths and clays, however, are also useful in carrying out the invention. In place of fuller's earth, an initial bed of filtering material such as pulverized coke or calcined bauxite may also be used in carrying out the invention.

We claim:

1. An improved process of cracking hydrocarbon oils, which comprises circulating a charge of oil in a pressure still from a bulk supply drum through heating tubes and back to the bulk supply drum, maintaining in the bulk supply drum submerged in the circulating charge of oil therein and extending entirely across the bulk supply drum in the path of the circulating oil a bed of finely divided fuller's earth, heating the oil to a cracking temperature in the heating tubes, taking off vapors from the bulk supply drum under pressure, supplying raw oil to the charge of oil in the pressure still during operation, and supplying finely divided fuller's earth to the operation in suspension in raw oil so supplied to the still charge, whereby the tendency toward the formation of a pitchy crust on top of the earth bed is inhibited.

2. An improved process of cracking hydrocarbon oils, which comprises circulating a charge of oil in a pressure still from a bulk supply drum through heating tubes and back to the bulk supply drum, maintaining in the bulk supply drum submerged in the circulating charge of oil therein and extending entirely across the bulk supply drum in the path of the circulating oil a bed of finely divided fuller's earth, heating the oil to a cracking temperature in the heating tubes, taking off vapors from the bulk supply drum under pressure, supplying raw oil to the circulating still charge as it circulates from the bulk supply drum to the heating tubes during operation, and supplying finely divided fuller's earth to the operation in suspension in raw oil so supplied to the still charge, whereby the tendency toward the formation of a pitchy crust on top of the earth bed is inhibited.

3. An improved process of cracking hydrocarbon oils, which comprises circulating a charge of oil in a pressure still from a bulk supply drum through heating tubes and back to the bulk supply drum, maintaining in the bulk supply drum submerged in the circulating charge of oil therein and extending entirely across the bulk supply drum in the path of the circulating oil a bed of finely divided fuller's earth, heating the oil to a cracking temperature in the heating tubes, taking off vapors from the bulk supply drum under pressure and subjecting them to a refluxing operation, introducing raw oil into direct contact with the vapors in this refluxing operation, returning refluxed condensate therefrom together with admixed unvaporized raw oil supplied thereto to the charge of oil in the pressure still, and supplying finely divided fuller's earth to the operation in suspension in raw oil so supplied to the still charge, whereby the tendency toward the formation of a pitchy crust on top of the earth bed is inhibited.

4. An improved process of cracking hydrocarbon oils, which comprises circulating a charge of oil in a pressure still from a bulk supply drum through heating tubes and back to the bulk supply drum, maintaining in the bulk supply drum submerged in the circulating charge of oil therein and extending entirely across the bulk supply drum in the path of the circulating oil a bed of filtering material, heating the oil to a cracking temperature in the heating tubes, taking off vapors from the bulk supply drum under pressure, supplying raw oil to the charge of oil in the pressure still during operation, and supplying finely divided fuller's earth to the operation in suspension in raw oil so supplied to the still charge, whereby the tendency toward the formation of a pitchy crust on top of the earth bed is inhibited.

5. An improved process of cracking hydrocarbon oils, which comprises circulating a charge of oil in a pressure still from a bulk supply drum through heating tubes and back to the bulk supply drum, maintaining in the bulk supply drum submerged in the circulating charge of oil therein and extending entirely across the bulk supply drum in the path of the circulating oil a bed of finely divided solid absorbent material, heating the oil to a cracking temperature in the heating tubes, taking off vapors from the bulk supply drum under pressure, supplying raw oil to the charge of oil in the pressure still during operation, and supplying finely divided solid absorbent material to the operation in suspension in raw oil so supplied to the still charge, whereby the tendency toward the formation of a pitchy crust on top of said bed of absorbent material is inhibited.

EUGENE C. HERTHEL.
HARRY L. PELZER.